(12) United States Patent
Christ

(10) Patent No.: US 12,517,339 B2
(45) Date of Patent: Jan. 6, 2026

(54) MICROSCOPE FOR EXAMINATION OF A SAMPLE AND CORRESPONDING METHOD OF OPERATING SUCH A MICROSCOPE

(71) Applicant: LEICA MICROSYSTEMS CMS GMBH, Wetzlar (DE)

(72) Inventor: Stefan Christ, Schoeffengrund (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 862 days.

(21) Appl. No.: 17/701,715

(22) Filed: Mar. 23, 2022

(65) Prior Publication Data

US 2022/0308329 A1    Sep. 29, 2022

(30) Foreign Application Priority Data

Mar. 25, 2021  (EP) .................................. 21164875

(51) Int. Cl.
| | |
|---|---|
| G02B 21/24 | (2006.01) |
| C12M 1/00 | (2006.01) |
| C12M 1/34 | (2006.01) |
| G02B 21/00 | (2006.01) |
| G02B 21/06 | (2006.01) |

(52) U.S. Cl.
CPC ............ *G02B 21/24* (2013.01); *C12M 23/50* (2013.01); *C12M 41/14* (2013.01); *C12M 41/36* (2013.01); *C12M 41/46* (2013.01); *G02B 21/0088* (2013.01); *G02B 21/06* (2013.01)

(58) Field of Classification Search
CPC .... G02B 21/24; G02B 21/0088; G02B 21/06; G02B 21/30; G02B 21/362; G02B 21/0004; G02B 21/34; C12M 23/50; C12M 41/14; C12M 41/36; C12M 41/46; G01N 21/84; G01N 21/01
See application file for complete search history.

(56) References Cited

U.S. PATENT DOCUMENTS

| | | | | |
|---|---|---|---|---|
| 2005/0282268 | A1 | 12/2005 | Kagayama | |
| 2007/0234829 | A1* | 10/2007 | Pirsch | B01L 1/00 73/863.11 |
| 2009/0103588 | A1* | 4/2009 | Umemura | C12M 41/36 374/141 |
| 2015/0050725 | A1* | 2/2015 | Pieczarek | C12M 37/02 435/303.1 |

* cited by examiner

*Primary Examiner* — Jennifer D. Carruth
*Assistant Examiner* — Agnes Dobrowolski
(74) *Attorney, Agent, or Firm* — LEYDIG, VOIT & MAYER, LTD.

(57) ABSTRACT

A microscope for microscopic examination of a sample includes an illumination optics for illuminating the sample, an imaging optics for imaging the sample, a sample chamber for receiving the sample. The sample chamber has a door providing access into the sample chamber. The microscope further includes a first fan assembly arranged on a first side of the sample chamber for blowing atmosphere into the sample chamber or for draining atmosphere out of the sample chamber, through at least one first opening arranged on the first side in a first side wall of the sample chamber, and at least one second opening arranged on a second side in a second side wall of the sample chamber for allowing atmosphere from inside the sample chamber to exit the sample chamber or for allowing atmosphere from outside the sample chamber to enter the sample chamber.

19 Claims, 7 Drawing Sheets

MICROSCOPE FOR EXAMINATION OF A SAMPLE AND CORRESPONDING METHOD OF OPERATING SUCH A MICROSCOPE

CROSS REFERENCE TO RELATED APPLICATIONS

This application claims benefit to European Patent Application No. EP 21164875.3, filed on Mar. 25, 2021, which is hereby incorporated by reference herein.

FIELD

Embodiments of the present invention is directed to a microscope for microscopic examination of a sample, particularly for examination of a sample to be located in a sample chamber of the microscope where the sample chamber is to be incubated with an incubation atmosphere adapted to the sample.

BACKGROUND

In the field of microscopic examination of living samples like cells, it is of interest to keep the sample as long as possible under favourable and stress-free environmental conditions. Incubators are used for generating a microclimate adapted to the sample to be examined. Existing incubators include stage top incubators and cage incubators.

Cage incubators include a climatic chamber enclosing the entire microscope or at least the main components of the microscope, such that a large volume needs to be incubated. Access to the working area for placing or manipulating the sample can be impaired since the microscope itself is located within the cage incubator. Further, it can be difficult to equip a microscope with a cage incubator in a space-saving manner. On the other hand, a stage top incubator provides a small volume to be incubated as the stage top incubator only encloses the sample itself and is placed onto the microscope stage. Although a stage top incubator has minimum space requirements, access to the sample can also be impaired since the sample is surrounded by a sealed box which would have to be opened, thus, destroying the incubation atmosphere within the box.

US 2005/0282268 A1 discloses a culture microscope having a housing section which serves as an incubator chamber for controlling an incubation atmosphere in which cells to be examined are cultured. The incubator chamber also includes the microscope stage and the objective lens. Separated from this incubator chamber and in another housing section, the illumination unit and the remaining components of the imaging optics are located. The incubator chamber comprises a lid which can be opened to provide access to the sample. While such a solution provides free access to the sample, the drawback of such incubation systems is that with every opening and closing of the lid, incubation atmosphere escapes the system very easily and needs to be replenished almost in full after every opening and closing of the lid.

Therefore, there is a need for an improved sample chamber solution in microscopes, particularly in microscopes comprising an incubated sample chamber.

SUMMARY

In an embodiment, the present disclosure provides a microscope for microscopic examination of a sample. The microscope includes an illumination optics for illuminating the sample, an imaging optics for imaging the sample, a sample chamber for receiving the sample. The sample chamber has a door providing access into the sample chamber. The microscope further includes a first fan assembly arranged on a first side of the sample chamber for blowing atmosphere into the sample chamber or for draining atmosphere out of the sample chamber, through at least one first opening arranged on the first side in a first side wall of the sample chamber, and at least one second opening arranged on a second side in a second side wall of the sample chamber for allowing atmosphere from inside the sample chamber to exit the sample chamber or for allowing atmosphere from outside the sample chamber to enter the sample chamber.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
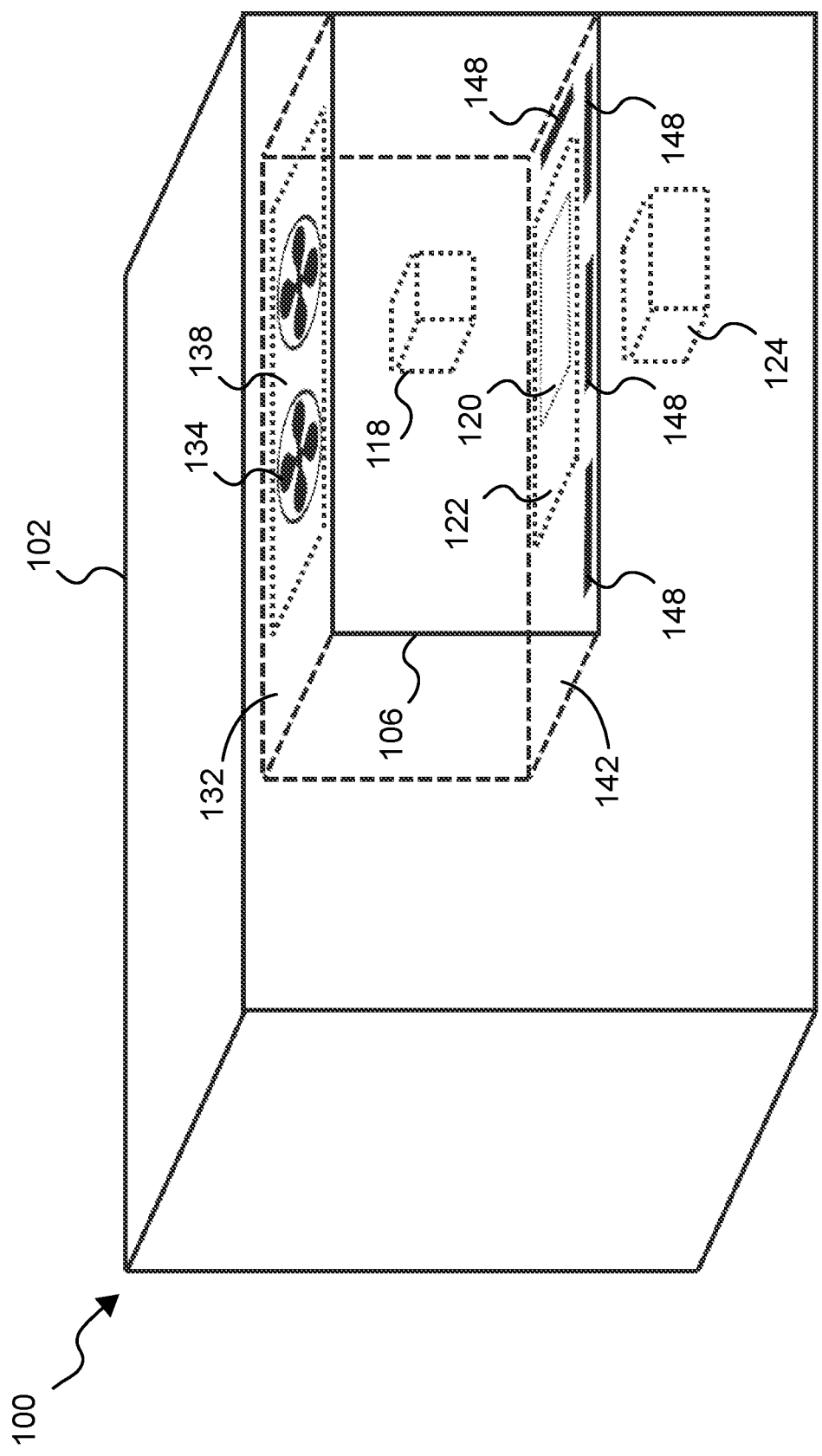
FIG. 1 shows schematically a microscope according to an embodiment of the present invention.

Embodiments of the present invention provide a microscope for microscopic examination of a sample. The microscope includes an illumination optics for illuminating the sample, an imaging optics for imaging the sample, a sample chamber for receiving the sample, the sample chamber having a door or a lid providing access into the sample chamber, a first fan assembly arranged on a first side of the sample chamber for blowing atmosphere into the sample chamber or for draining atmosphere out of the sample chamber through at least one first opening arranged on the first side in a first side wall of the sample chamber, and at least one second opening arranged on a second side in a second side wall of the sample chamber for allowing atmosphere from inside the sample chamber to exit the sample chamber or for allowing atmosphere from outside the sample chamber to enter the sample chamber.

Embodiments of the present invention provide a microscope that includes a relatively large sample chamber providing free access to the sample, and at the same time providing a flow of atmosphere through the sample chamber. It should be noted, embodiments of the present invention are not limited to incubated sample chambers, but can also be used in microscopes where a flow of atmosphere, particularly a laminar flow may be beneficial to the examination of the sample or to the sample itself. Therefore, without loss of generality, the use of terms such as "incubated sample chamber" or "incubation atmosphere" is not to be regarded limiting the scope of the present invention.

Embodiments of the present invention provide the advantage of a directed flow of atmosphere through the sample chamber, the flow preferably being a laminar flow or an substantially laminar flow. Such a directed flow of atmosphere has a number of advantages. First, the flow can entrain any particles, like dust, dirt, and germs, entering the sample chamber and transport them to an exit opening. Second, the directed flow acts like a shield or curtain preventing atmosphere from escaping the sample chamber and preventing external atmosphere from entering the sample chamber. These effects allow for a (semi)sterile work environment around the sample placed on a microscope stage inside the sample chamber. Further, in case of an incubated sample chamber, it is possible to recycle incubation atmosphere. Incubation atmosphere drained out of the sample chamber may be recycled and blown back into the sample chamber. A part of the incubation atmosphere may be refreshed or replenished. This saves incubation atmosphere volume and energy after opening and closing of the door of the sample chamber.

In an embodiment, the first fan assembly may include one or more fans or blowers for blowing atmosphere through at least one first opening in the first side wall of the sample chamber. The first fan assembly is preferably arranged close to or directly at the at least one first opening, and preferably outside the sample chamber, or in the at least one first opening. The at least one first opening may be a single opening covering the one or more fans/blowers of the first fan assembly or may include two or more openings for conducting atmosphere blown by the first fan assembly into the interior of the sample chamber, each opening being preferably assigned to one of the plurality of fans/blowers of the first fan assembly. In this embodiment, at least one second opening is arranged in a second side wall of the sample chamber, the second side wall being different to the first side wall, for allowing atmosphere from inside the sample chamber to exit the sample chamber. Similarly, one or more second openings can be provided in the second side wall of the sample chamber.

In an embodiment, the location, geometry and size of the at least one second opening is determined such that a non-turbulent flow of atmosphere, preferably a laminar or substantially laminar flow is created. The creation of a laminar flow can also be influenced by location, number, and power of the fans of the first fan assembly as well as by the number, sizes, geometries and locations of the first opening(s). Generally, it is preferred that the first side of the sample chamber is opposite the second side of the sample chamber in order to create a steady flow of atmosphere through the sample chamber. Further, it is preferred if the first side is a top side, and the second side is a bottom side of the sample chamber, and if the first side wall is a top side wall and the second side wall is a bottom side wall of the sample chamber. In some embodiments, the sample chamber is of rectangular solid form or of substantially rectangular solid form or of a cubic or substantially cubic form.

According to some embodiments of the present invention, the first fan assembly is constructed as a suction fan assembly for draining atmosphere out of the sample chamber through the at least one first opening, such that the at least one second opening allows atmosphere from outside the sample chamber to enter into the sample chamber. The same considerations regarding the first fan assembly, the at least one first opening and the at least one second opening apply here in order to preferably create a non-turbulent flow of atmosphere, more preferably a laminar flow or an substantially laminar flow of atmosphere through the sample chamber.

In another embodiment, a second fan assembly is arranged on the second side of the sample chamber for draining atmosphere through the at least one second opening out of the sample chamber or for blowing atmosphere through the at least one second opening into the sample chamber. The second fan assembly can thus be regarded a support for creating an additional suction or blowing pressure for draining or blowing atmosphere through the second opening. The second fan assembly may include a single fan or a plurality of fans/blowers arranged close to or at the at least one second opening, and preferably outside the sample chamber, or even in the at least one second opening. Depending on the power of such a second fan assembly, it is possible to use only one single fan for creating sufficient suction power for draining atmosphere out of the sample chamber. In some embodiments, it is preferred to use one or more fans/blowers as the second fan assembly when used as a blower for blowing atmosphere into the sample chamber.

It is advantageous if the first fan assembly is configured to blow atmosphere through the at least one first opening and is arranged in or at the first side wall. Further, it is preferred if the first side wall is at least a part of the top side wall of the sample chamber. According to this embodiment, a flow of atmosphere is created from the top side of the sample chamber down to the bottom side, preferably a flow in the direction of the microscope stage and/or the sample.

It is also advantageous if the second fan assembly is configured to drain atmosphere through the at least one second opening and is arranged outside the second side wall. It is further advantageous to use only a small number if not only one fan for creating suction power outside the second side wall to drain atmosphere through the second opening(s).

In an embodiment, the door of the sample chamber is arranged laterally of the first and the second side walls of the sample chamber such that a main direction of access into the sample chamber (corresponding to the surface normal on the door surface when the door is closed) is perpendicular or substantially perpendicular to the direction of the flow of atmosphere. In the normal case of a sample chamber being of substantially rectangular solid form, the sample chamber preferably includes at least one side door as the door providing access into the sample chamber. The at least one side door is a door in a third and/or fourth side wall of the sample chamber, the third/fourth side wall being substantially perpendicular to the first/second side wall. With such an arrangement, any contamination carried in by a user accessing the sample chamber through the opened door is entrained by the flow of atmosphere and transported to the exit openings. This set up allows for a (semi)sterile work environment for the sample. At the same time, the amount of atmosphere escaping or entering the sample chamber can be significantly reduced since the flow of atmosphere acts as a curtain or shield preventing atmosphere from inside the sample chamber escaping or atmosphere from outside the sample chamber entering the sample chamber during opening the side door.

In an embodiment, the second openings are arranged around and/or next to a microscope stage arranged at the bottom side inside the sample chamber. In this embodiment, the flow of atmosphere is directed from the at least one first opening to the second openings arranged around and/or next to the microscope stage where the sample is to be placed.

Thus, at least a part of the microscope stage can be surrounded or protected by a flow of atmosphere. It is further preferred to arrange the second openings such that a shield or curtain is formed against an access direction from the door of the sample chamber.

In an embodiment, the sample chamber is arranged inside a microscope housing of the microscope which microscope housing encloses at least partly the sample chamber. It is preferred if a separated housing section forms the sample chamber, especially if the sample chamber is used as an incubated sample chamber. The door providing access into the sample chamber preferably is a door in the microscope housing, i.e. the sample chamber and the microscope housing share this door.

Further, it is advantageous if the microscope housing provides space for recirculation of atmosphere outside the sample chamber for recirculation of atmosphere between the at least one first opening and the at least one second opening. In this embodiment, the sample chamber is surrounded by a microscope housing, e.g. in the form of a microscope housing section, and atmosphere drained out of the sample chamber is blown into the surrounding housing section. In this housing section, the atmosphere can be replenished and/or its temperature and composition can be adjusted, and then, the adjusted atmosphere can be reintroduced into the sample chamber.

In this context, it is preferred if the microscope housing surrounding the sample chamber also encloses the second fan assembly, particularly if this second fan assembly is configured to drain atmosphere through the at least one second opening out of the sample chamber.

It is advantageous if a first filter system is provided configured to filter atmosphere flowing through the at least one first opening. The filter system may be arranged at or in the at least one first opening. Such a first filter system can be useful when atmosphere is blown through the at least one first opening into the inside of the sample chamber. The first filter system can help clean the atmosphere flowing into the sample chamber from any particles like dust, dirt or germs.

It should be noted that it may also be advantageous to provide another (second) filter system configured to filter atmosphere flowing through the at least one second opening.

Furthermore, it is advantageous if at least one third filter system is provided and configured to filter air flowing through one or more openings or leaks of the microscope housing surrounding the sample chamber into the interior of said housing. The existence of such leaks in microscope housings is most commonly inevitable. The openings can also be small openings for refreshing the atmosphere inside the microscope housing with fresh air from outside the microscope housing. Again, the third filter system helps clean any atmosphere entering the inside of the microscope housing.

In general, it might be reasonable to provide any openings and/or leaks of the sample chamber and/or of the surrounding microscope housing with filters or filter systems as described above.

As already mentioned above, it is particularly preferred if the first fan assembly, the at least one first opening and the at least one second opening of the microscope according to embodiments of the present invention are configured to generate a laminar flow through the inside of the sample chamber. As opposed to turbulent flows, a laminar flow can work best as a curtain or shield and can most efficiently entrain any particles and transport them to exit openings.

As also discussed above, embodiments of the present invention may be used for incubated sample chambers containing an incubation atmosphere. Such microscopes can provide a user-defined incubation atmosphere with predetermined contents of $H_2O$ and $CO_2$. Additionally, $N_2$ may be introduced for displacing $O_2$ in order to reduce the oxygen content. The temperature of such an incubation atmosphere can be controlled.

Embodiments of the present invention also provide a method of operating a microscope for microscopic examination of a sample. The microscope includes an illumination optics for illuminating the sample, an imaging optics for imaging the sample, and a sample chamber for receiving the sample. The method includes the steps of blowing atmosphere into the sample chamber through at least one first opening arranged on a first side in a first side wall of the sample chamber or draining atmosphere out of the sample chamber through at least one first opening arranged on a first side in a first side wall of the sample chamber. The method further includes the step of allowing atmosphere from inside the sample chamber to exit the sample chamber through at least one second opening arranged on a second side in a second side wall of the sample chamber or allowing atmosphere from outside the sample chamber to enter the sample chamber through at least one second opening arranged on a second side in a second side wall of the sample chamber, for generating a flow or a laminar flow or an substantially laminar flow through the inside of the sample chamber.

In an embodiment of the method, the flow or the laminar flow or the substantially laminar flow is generated, more specifically continued to be generated, while a door providing access into the sample chamber is open for accessing the sample chamber, for example, for inserting a sample into the sample chamber, for removing a sample from the sample chamber or for manipulating a sample in the sample chamber.

In another embodiment, the flow or the laminar flow or the substantially laminar flow is generated during microscopic examination of a sample in the sample chamber. In this embodiment, starting the generation of the atmosphere flow can be triggered with starting the microscope itself or can be switched on by a user at an early point of microscopic examination of the sample. In order to achieve the above advantages of a sterile or semi-sterile working environment and of saving incubation atmosphere, it is advantageous to start generating the flow of atmosphere at the time of turning on the microscope and to continue the generation of the flow of atmosphere during every opening and closing of the door/lid providing access into the sample chamber.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

It should be noted that features of the above examples as well as of the examples explained below can—wholly or in part—be combined to other examples not explicitly mentioned herein, nevertheless being part of the present disclosure.

In the following, the figures are described comprehensively, same reference signs designating same or at least structurally identical components.

FIG. 1 schematically shows a microscope 100 according to some embodiments of the present invention. The microscope 100 includes a microscope housing 102 surrounding, at least partly, a sample chamber 106. The microscope 100 includes an illumination optics 118 for illuminating a sample, and an imaging optics 124 for imaging the sample. The sample is designated 120 and is placed on a microscope stage 122. Thus, in this embodiment, microscope 100 is an inverted transmitted-light microscope. The sample chamber 106 forms a separated space and is preferably formed by a housing section of the microscope 100. The sample chamber 106 may be an incubated sample chamber comprising incubation atmosphere which is adapted e.g. for the examination of living cells. In this embodiment, the sample chamber 106 includes the illumination optics 118 and the upper part of the microscope stage 122 and of the sample carrier including the sample 120. Imaging optics 124 is arranged below the microscope stage and includes a microscope objective and further optical components and optionally a camera or the like for generating/viewing a microscopic image of the sample 120. It should be noted that parts of the imaging optics 124 may also be located outside the housing 102.

Figure 2:
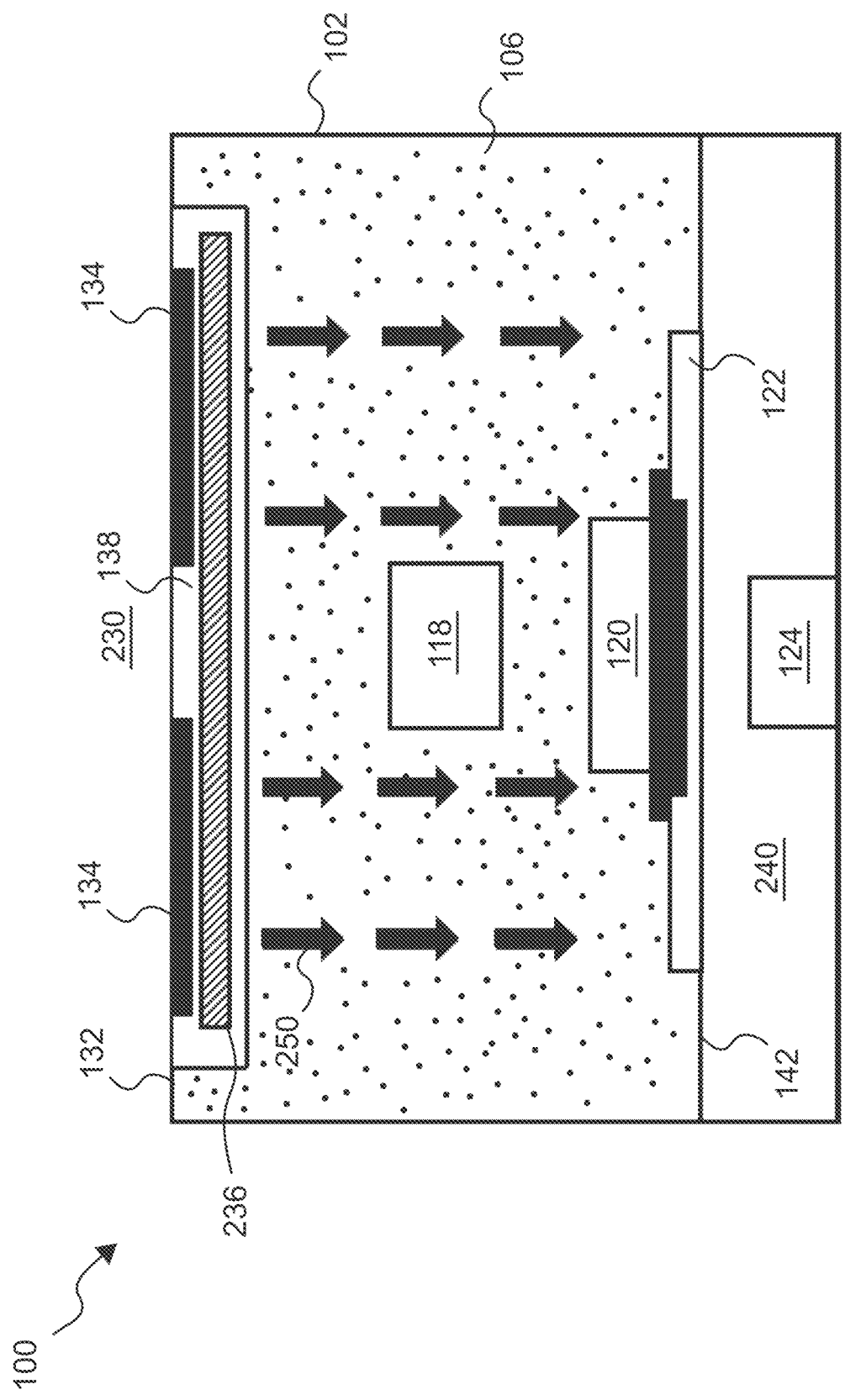
FIG. 2 shows schematically a microscope according to an embodiment of the present invention.

As can be seen from FIG. 1, a first fan assembly 134 is arranged on a first upper side of the sample chamber 106 for blowing atmosphere into the sample chamber 106 through a first opening 138 arranged in a first side wall 132 of the sample chamber 106. As can be seen, the first opening 138 receives two fans for blowing atmosphere into the sample chamber 106. The opening 138 is formed to receive a first filter system 236 which may be a filter extending through the entire opening 138 as shown in FIG. 2. It is, however, also possible to provide single openings for each of the fans of the first fan assembly 134, and to optionally arrange filters in these openings.

A plurality of second openings 148 is arranged on a second lower side of the sample chamber 106 in a second side wall 142 for allowing atmosphere from inside the sample chamber 106 to exit the sample chamber (also called "exit openings"). In this embodiment, a number of second exit openings 148 are arranged along a longer edge and a shorter edge of the second side wall 142 as shown in FIG. 1.

In such an embodiment, when the first fan assembly 134 is activated, a directed flow of atmosphere from the upper side of the sample chamber down to the exit openings 148 in the lower side wall 142 is generated. Preferably, the directed flow of atmosphere is a laminar flow as will be further described below.

Atmosphere escaping from the interior of the sample chamber 106 on its lower side passes through the interior of the microscope housing 102 and is sucked in by the first fan assembly 134 and again blown into the sample chamber 106. Thus, a steady flow of atmosphere can be created. Further features, options and advantages are described in connection with the further embodiments below.

FIG. 2 shows a similar embodiment of a sample chamber 106 as FIG. 1. While FIG. 1 is a perspective view, FIG. 2 shows an embodiment as viewed from the front. In this embodiment, the first opening 138 is formed into the upper side wall 132 of the sample chamber 106 on the upper side 230. The opening 138 receives a first filter system 236 which may be a filter extending through the opening 138 as shown in FIG. 2. The first fan assembly 134, again comprising two fans, is arranged in the first opening 138 of the first side wall 132 such that atmosphere blown into the sample chamber 106 passes through the filter system 236. The filter system 236 cleans the atmosphere from any particles, like dust, dirt and/or germs.

Second openings (not shown in FIG. 2) are arranged opposite the first side 230 of the sample chamber 106 on the second side 240. With such an arrangement, a laminar flow 250 as indicated by the arrows can be generated.

Further features, options and advantages are described in connection with the further embodiments below.

Figure 3:
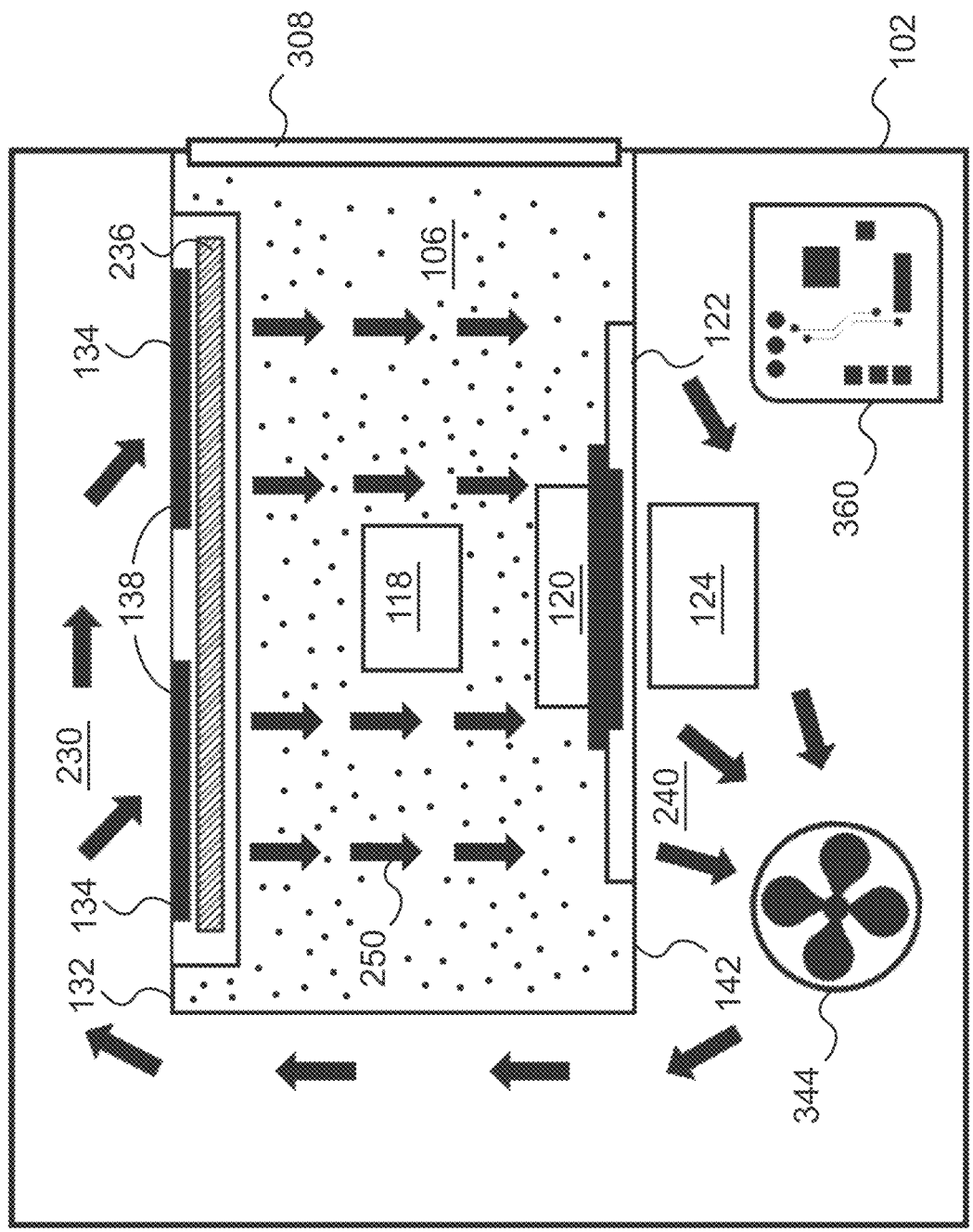
FIG. 3 shows a microscope according to yet another embodiment of the present invention.

FIG. 3 shows an embodiment similar to that of FIGS. 1 and 2 including a second fan assembly 344 arranged on the second side 240 of the sample chamber 106, in this case, below the second side wall 142. Regarding the first fan assembly 134 reference is made to FIG. 2. The second fan assembly 344 includes one single fan for sucking in atmosphere flowing through the at least one second opening 148 arranged on the second side 240 in the second side wall 142 of the sample chamber 106. Thus, the second fan assembly 344 supports circulation of atmosphere through the inside of the microscope housing 102 and through the inside of the sample chamber 106. A control unit 360 is arranged inside the housing 102 for adjusting the powers of the first and second fan assemblies 134, 344 for generating an optimal, particularly laminar flow through the sample chamber 106. The control unit 360 may also fulfill additional tasks, e.g. in connection with the operation of the microscope 100.

As can be seen from FIG. 3, a front door 308 for accessing the sample chamber 106 is arranged laterally of the first (upper) side wall 132 and laterally of the second (lower) side wall 142 of the sample chamber 106. Other or additional doors may be provided as desired. However, as will be explained further below in connection with FIG. 6, it is mostly preferred to provide access into the sample chamber 106 through a door 308, the surface normal of the closed door 308 being substantially perpendicular to the direction of flow 250 through the sample chamber 106.

Figure 4:
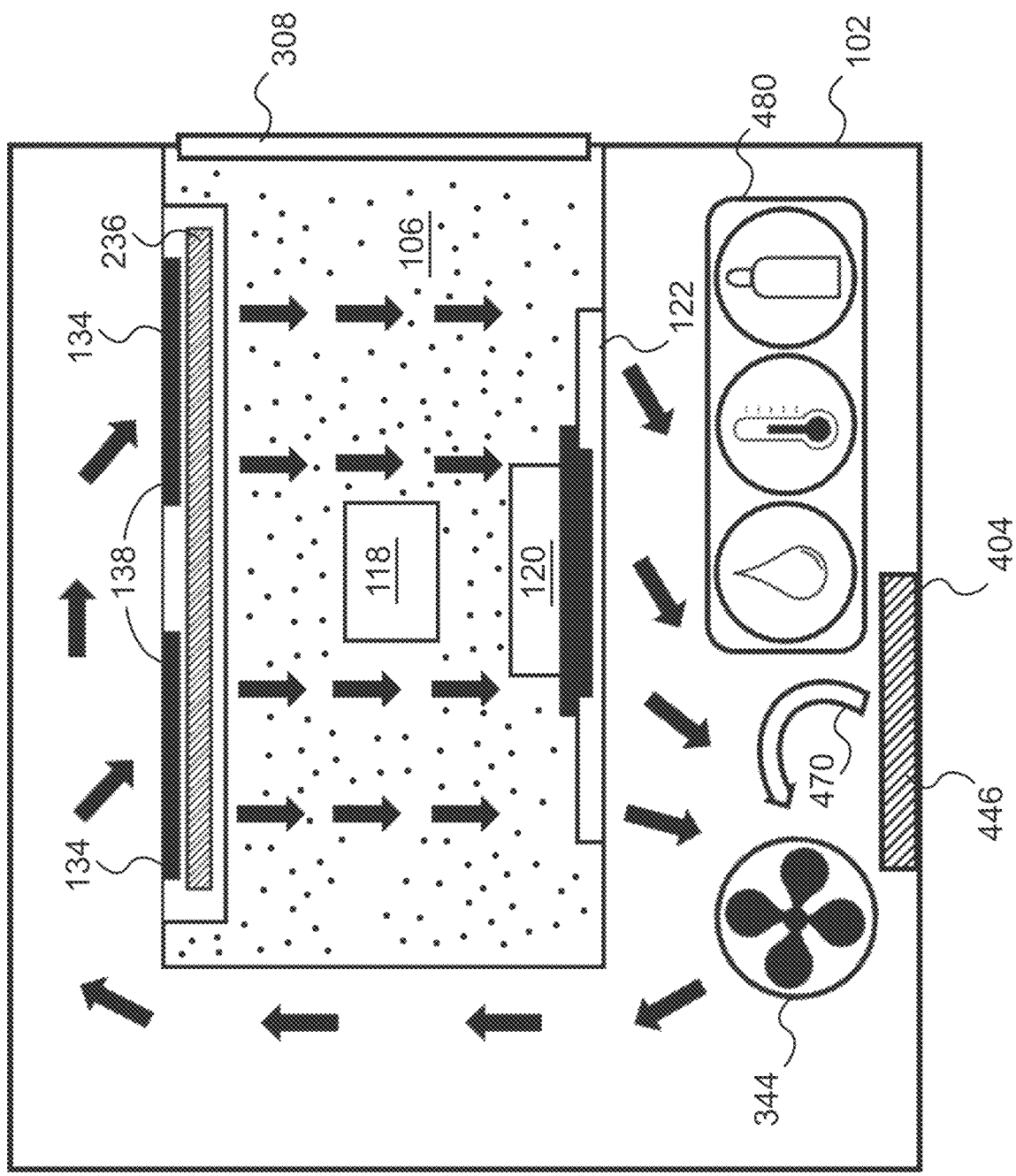
FIG. 4 shows a microscope according to yet another embodiment of the present invention.

FIG. 4 shows a microscope 100 having an incubated sample chamber 106 according to yet another embodiment. This embodiment is very similar to the one described above in connection with FIG. 3 such that in the following only differentiating or additional features are discussed. It should be noted that distinguishing and/or additional features among different embodiments may be combined to new embodiments still within the scope of the present invention. The embodiment of FIG. 4 shows an incubation control unit 480 for controlling and adjusting parameters of the incubation atmosphere circulating between the interior of the sample chamber and the outside of the sample chamber within the microscope housing 102 as indicated by the arrows.

Suitable incubation atmospheres comprise air with a predefined content of $H_2O$ (relative humidity) and a predefined content of $CO_2$ (carbon dioxide). It is also desirable to conduct hypoxia experiments with a deficiency of oxygen in the atmosphere. In some embodiments, the temperature of the incubation atmosphere can be set in a range between ambient temperature up to 50° C., the $CO_2$-range is set between 0.5 to 20%, and the $O_2$-range is between 1 to 18%. The humidity must be balanced to ensure that potential condensation is avoided or at least does not harm neither the microscope components nor the sample 120 itself. It is preferred to control at least the temperature, the humidity and the $CO_2$-content on its own. In hypoxia experiments, the $O_2$-content is controlled by introduction of $N_2$ (nitrogen). These parameters of the incubation atmosphere can be controlled and adjusted by the incubation control unit 480. In order to control the above parameters, it is preferred to arrange corresponding sensors (not shown) in the sample chamber 106 and/or inside the microscope housing 102 and/or at the microscope stage 122, preferably close to the sample 120.

As further shown in FIG. 4, a third filter system 446 is arranged at an opening or leak 404 of the microscope housing 102. Such an opening/leak 404 may allow fresh air from outside the microscope 100 to be conducted into the inside of the microscope housing 102. Such air is filtered by a third filter system 446 and sucked into the second fan assembly 344 as shown by the arrow 470.

As already noted above, again the control unit 360 of the embodiment of FIG. 3 may be used to regulate the power of the second fan assembly 344 in order to control its suction pressure. Control unit 360 may be connected to the incubation control unit 480 for best results in this regard.

Figure 5:
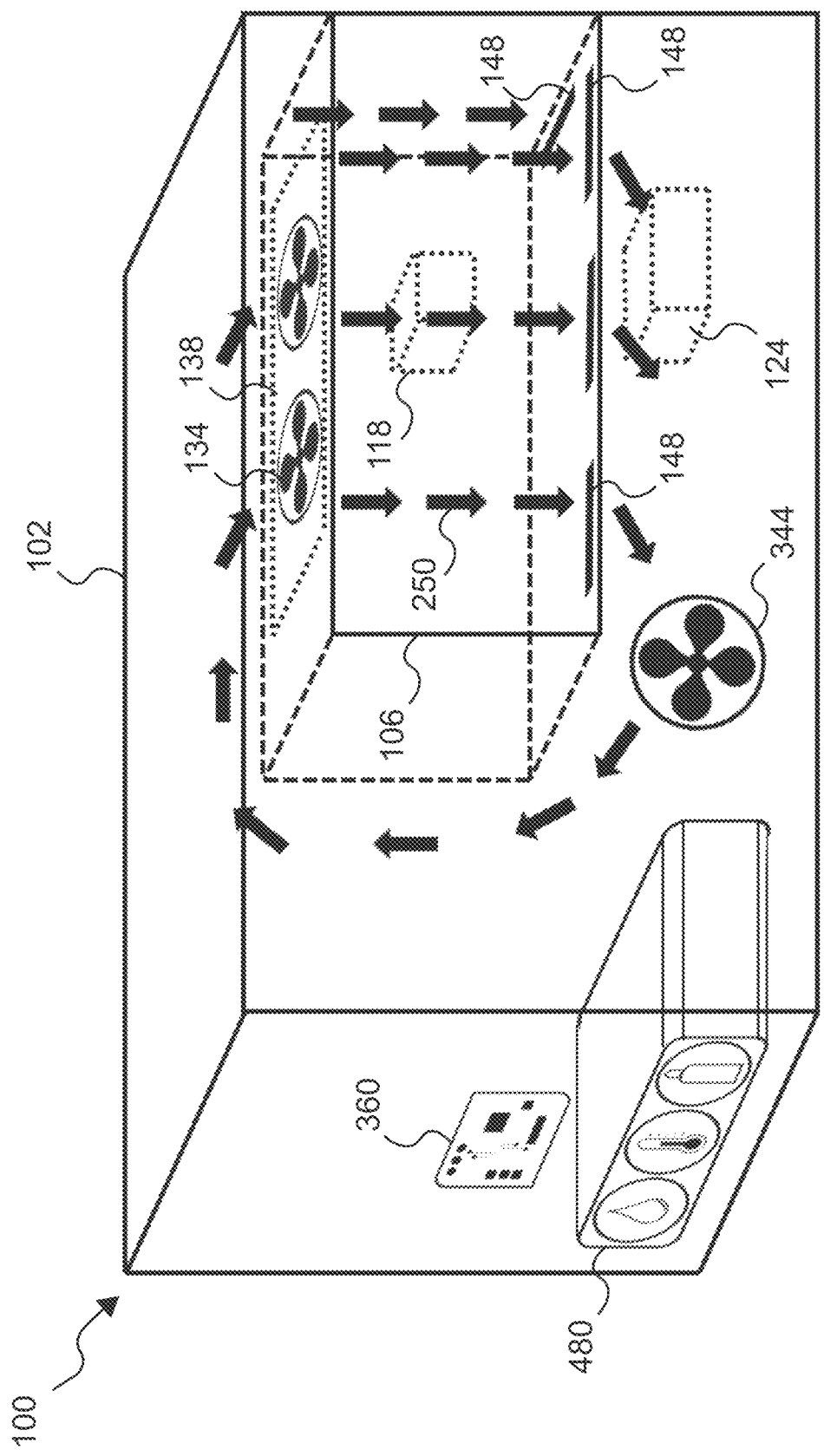
FIG. 5 shows a microscope according to yet another embodiment of the present invention.

FIG. 5 shows yet another embodiment which mainly corresponds to the one of FIG. 4. In FIG. 5, a control unit 360 as already discussed above, is arranged inside the microscope housing 102 together with an incubation control unit 480. FIG. 5 shows a perspective view showing the distribution of the second (exit) openings 148 along the two edges of the lower side wall 142. As can be seen from FIG. 5, a laminar flow 250 is created, the laminar flow 250 acting as a shield or curtain around one side of the microscope stage 122 (see also FIG. 1), the shield/curtain of atmosphere preventing intrusion of particles including germs into the sample chamber, particularly onto the sample 120 itself, and simultaneously prevents atmosphere from inside the sample chamber to escape from the same and atmosphere from outside the sample chamber to invade the sample chamber.

Figure 6:
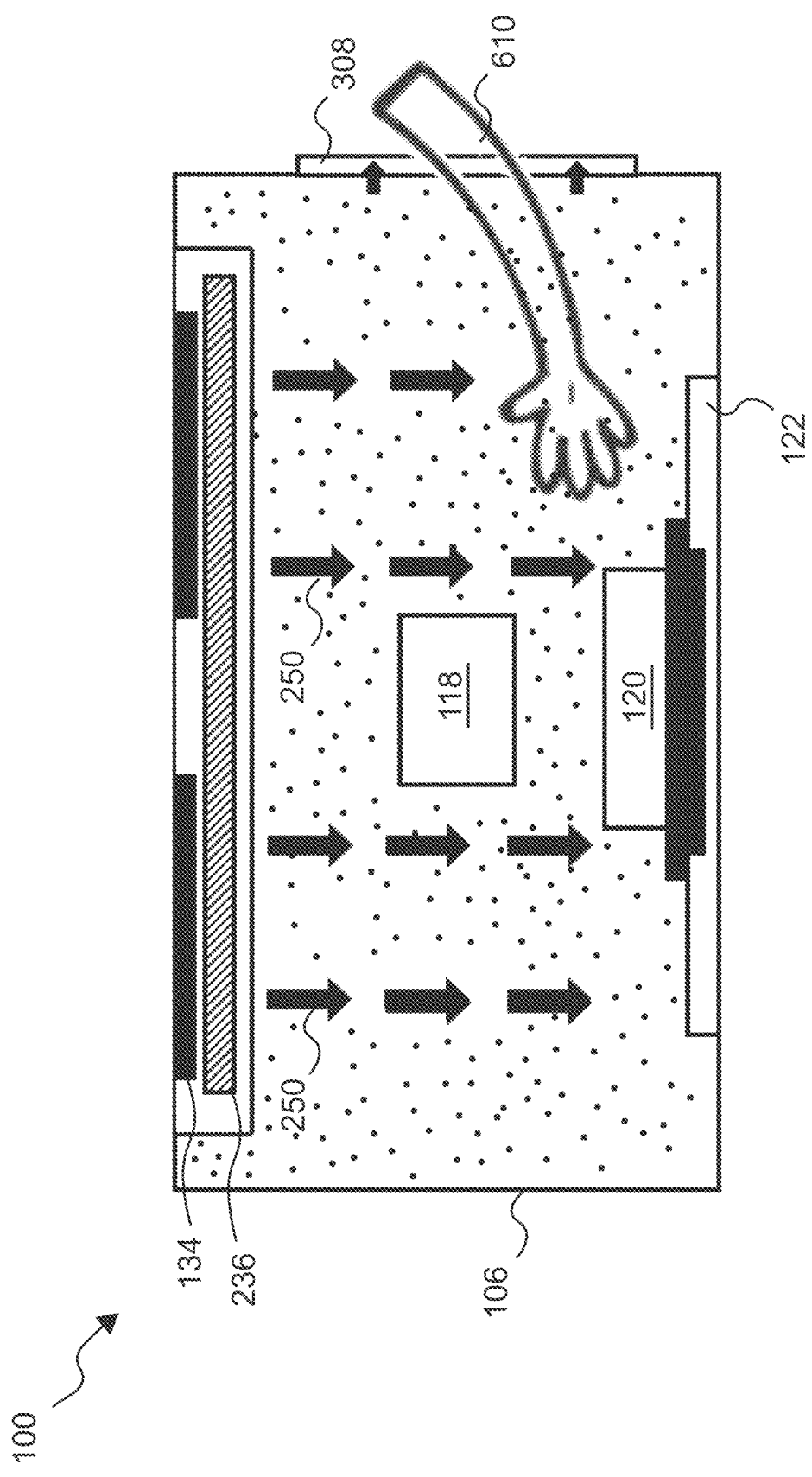
FIG. 6 shows a microscope according to yet another embodiment of the present invention.

This effect is more clearly illustrated in FIG. 6 showing a user's arm 610 entering the sample chamber 106 through the opened side door 308. As can be seen from FIG. 6, the laminar flow 250 is only interrupted in a small region around the user's arm 610 such that the remaining flow 250 of atmosphere still acts as a protective shield. Further, any contamination brought in by the user's arm 610 can be entrained by the flow 250 of atmosphere and transported to the exit openings 148 in the lower side wall of the sample chamber 106. Apart from that, the embodiment of FIG. 6 corresponds to any one of the previous embodiments of FIGS. 1 to 5 and can be combined with one or more features of those embodiments.

Figure 7:
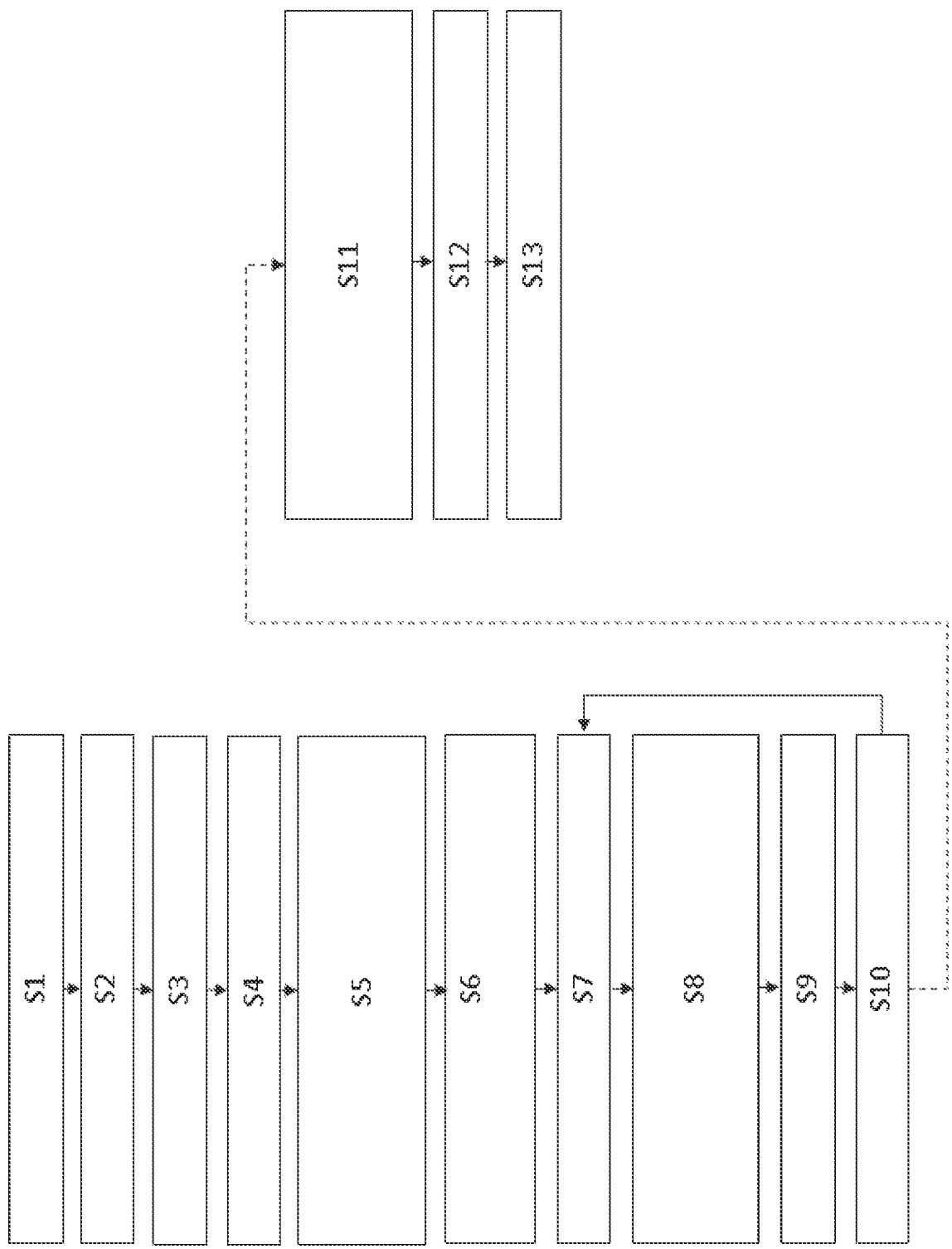
FIG. 7 shows a flowchart illustrating a method for operating a microscope according to embodiments of the present invention.

FIG. 7 shows a flowchart illustrating a method for operating a microscope according to the present inventive concept.

In step S1, the microscope 100 is started and, at the same time, generation of the flow of atmosphere through the inside of the sample chamber 106 is started by activating the first fan assembly 134, and optionally the second fan assembly 344, of the embodiments described above. However, the method described by this embodiment is not limited to the embodiments shown in FIGS. 1 to 6 but can be applied to other microscopes according to the present inventive concept as defined by the appended claims. In the embodiment of FIG. 7, the sample chamber 106 is an incubated sample chamber 106 as, for instance, shown in FIGS. 4 and 5.

After activating the corresponding fans, the incubation process is started (step S2) by activating the incubation control unit 480 (of the embodiment of FIGS. 4, 5). During step S3 it is waited until the incubation set point is reached. A corresponding signal may be sent from the incubation control unit 480 to the control unit 360 (as shown in FIG. 5). Control unit 360 may send a signal to a microscope user interface that the microscope is ready to be used. The front door 308 (see FIG. 4) may then be opened by a user or by an automated mechanism (loader) either to place a sample 120 onto the microscope stage 122 (see FIG. 4) or to manipulate the sample 120. During this step S4 the flow of atmosphere is continued to be generated. This yields the results and advantages as discussed in connection with FIG. 6 as described above.

In an optional step S5 inner surfaces of the sample chamber 106 may be disinfected or cleaned, e.g. by alcohol, UV radiation etc., while continuing the generation of the laminar flow 250 inside the chamber 106 (see FIG. 5).

In case of step S5, it is preferred to insert a sample 120 (manually or with a loader) into the sample chamber on the microscope stage 122 after step S5 in step S6. After that, the door 308 is closed in step S7.

After closing the door, the incubation atmosphere is equilibrated to the incubation set point of step S3. Due to the protective shield owing to the flow 250 of atmosphere, incubation atmosphere can be equilibrated with minimum effort (volume, energy, gases). In step S8 also microscopic imaging of the sample 120 is performed while the continuous flow of atmosphere is upheld.

After examination of the sample 120, in step S9, the door 308 is opened while the continuous flow of atmosphere is upheld. Then, in step S10 the sample is unload and, optionally, another sample is loaded (manually or with an automatic loader) for further examination.

In the latter case, the method returns to optional step S7 where the door is closed to continue with steps S8 to S10.

Should no further examination be required, the method turns to step S11 where the inner surfaces of the sample chamber may again be disinfected or cleaned while a continuous flow of atmosphere may still be upheld.

In the following step S12, the door 108 is closed and the user may shut down the microscope 100 including switching off the regulation of incubation atmosphere by the incubation control unit 480 and stopping the circulation of atmosphere by the first and second fan assemblies 134, 344 (see FIG. 5) (step S13).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 microscope housing
106 sample chamber
118 illumination optics
120 sample
122 stage
124 imaging optics
132 first side wall
134 first fan assembly
138 first opening
142 second side wall
148 second opening
230 first side
236 first filter system
240 second side
250 flow of atmosphere
344 second fan assembly
352 third side wall
360 control unit
404 opening, leak
446 third filter assembly
470 filtered air
480 incubation control unit
610 user arm
S1-S13 method steps

The invention claimed is:

1. A microscope for microscopic examination of a sample, the microscope comprising
   an illumination optics for illuminating the sample,
   an imaging optics for imaging the sample,
   a sample chamber for receiving the sample, the sample chamber having a door providing access into the sample chamber, the sample chamber having a top side wall at a top side thereof and a bottom side wall at a bottom side thereof, the top side wall having at least one first opening, and
   a first fan assembly arranged in or at the at least one first opening of the top side wall for blowing atmosphere into the sample chamber or for draining atmosphere out of the sample chamber through the first opening,
   wherein the bottom side wall has at least one second opening for allowing atmosphere from inside the sample chamber to exit the sample chamber or for allowing atmosphere from outside the sample chamber to enter the sample chamber.

2. The microscope according to claim 1, further comprising a second fan assembly arranged on the bottom side of the sample chamber for draining atmosphere through the at least one second opening out of the sample chamber or for blowing atmosphere through the at least one second opening into the sample chamber.

3. The microscope according to claim 1, wherein the first fan assembly is configured to blow atmosphere through the at least one first opening.

4. The microscope according to claim 2, wherein the second fan assembly is configured to drain atmosphere through the at least one second opening and is arranged outside the bottom side wall.

5. The microscope according to claim 1, wherein the door providing access into the sample chamber is arranged laterally of the top side wall and the bottom side wall of the sample chamber.

6. The microscope according to claim 1, wherein the sample chamber is of substantially rectangular solid form and includes at least one side door as the door providing access into the sample chamber.

7. The microscope according to claim 1, wherein the second openings are arranged around and/or next to a microscope stage arranged at the bottom side inside the sample chamber.

8. The microscope according to claim 1, wherein the sample chamber is arranged inside a microscope housing enclosing at least partly the sample chamber.

9. The microscope according to claim 8, wherein the door providing access into the sample chamber is a door in the microscope housing.

10. The microscope according to claim 8, wherein the housing provides space for recirculation of atmosphere outside the sample chamber between the at least one first opening and the at least one second opening.

11. The microscope according to claim 2, wherein the sample chamber is arranged inside a microscope housing enclosing at least partly the sample chamber, and wherein the microscope housing encloses the second fan assembly.

12. The microscope according to claim 1, further comprising a first filter system configured to filter atmosphere flowing through the at least one first opening, and/or a second filter system configured to filter atmosphere flowing through the at least one second opening.

13. The microscope according to claim 8, further comprising at least a filter system configured to filter air flowing through one or more openings and/or leaks of the microscope housing into an interior of the microscope housing.

14. The microscope according to claim 1, wherein the first fan assembly, the at least one first opening and the at least one second opening are configured to generate a laminar flow inside the sample chamber.

15. The microscope according to claim 1, wherein the sample chamber is an incubated sample chamber containing incubation atmosphere.

16. A method of operating a microscope for microscopic examination of a sample, the microscope comprising
    an illumination optics for illuminating the sample,
    an imaging optics for imaging the sample, and
    a sample chamber for receiving the sample, the sample chamber having a top side wall at a top side thereof and a bottom side wall at a bottom side thereof,
    the method comprising:
    via a first fan assembly arranged in or at least one first opening of the top side wall, blowing atmosphere into the sample chamber or draining atmosphere out of the sample chamber through the at least one first opening of the top side wall of the sample chamber, and
    allowing atmosphere from inside the sample chamber to exit the sample chamber or allowing atmosphere from outside the sample chamber to enter the sample chamber, through at least one second opening arranged on the bottom side in the bottom side wall of the sample chamber for generating a flow inside the sample chamber of the microscope.

17. The method according to claim 16, wherein the flow is generated or is continued to be generated while a door providing access into the sample chamber is open for accessing the sample chamber.

18. The method according to claim 16, wherein the flow is generated or is continued to be generated during microscopic examination of the sample in the sample chamber.

19. The method according to claim 16, wherein the flow is a laminar flow.

* * * * *